July 22, 1958 — J. P. WATSON — 2,844,743
DETENT MECHANISMS
Filed May 28, 1957 — 3 Sheets-Sheet 1
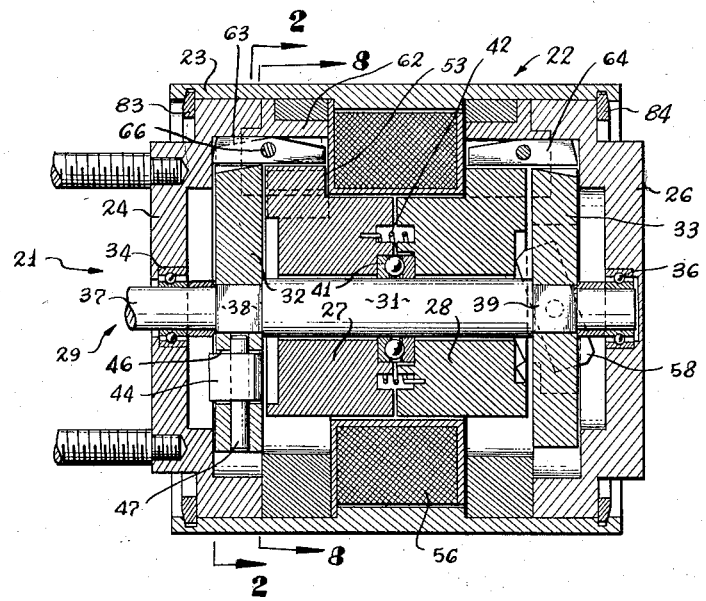
Fig. 1
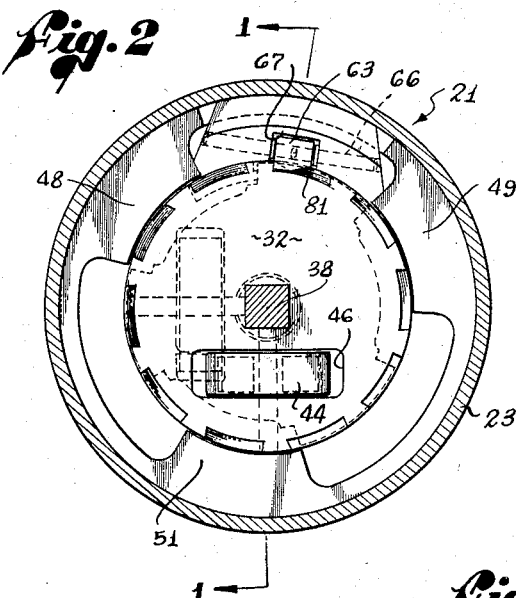
Fig. 2
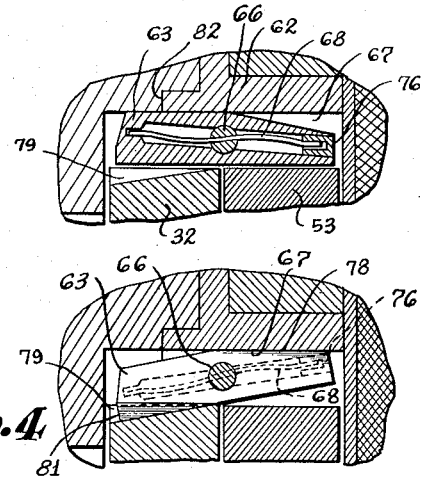
Fig. 3
Fig. 4
INVENTOR:
JAMES P. WATSON
HERZIG & JESSUP
ATTORNEYS
By Warren T. Jessup July 22, 1958  J. P. WATSON  2,844,743
DETENT MECHANISMS
Filed May 28, 1957  3 Sheets-Sheet 2
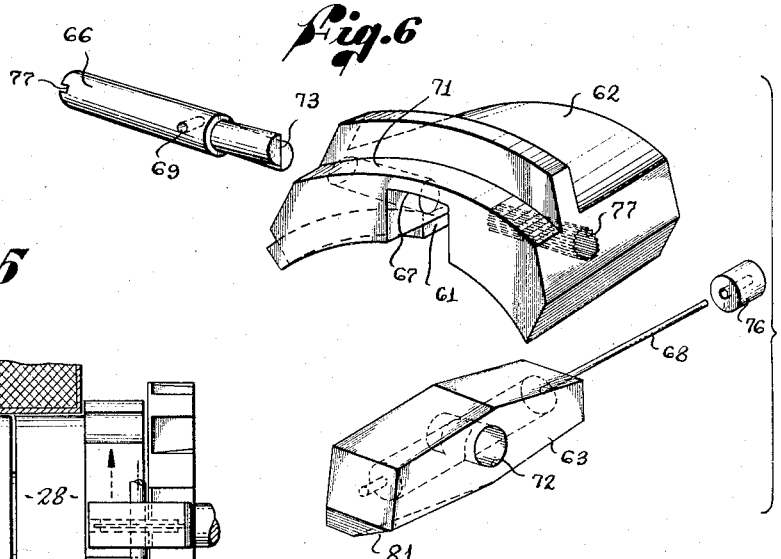
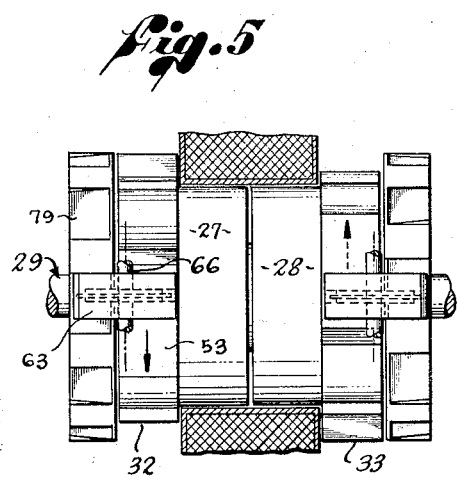
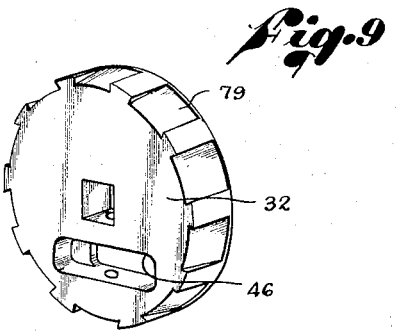
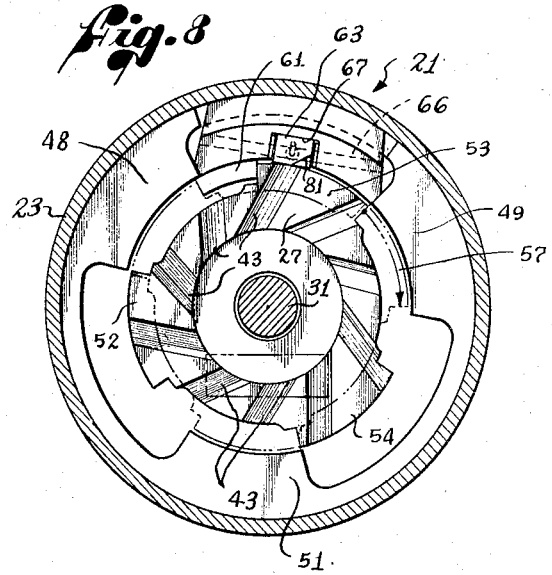
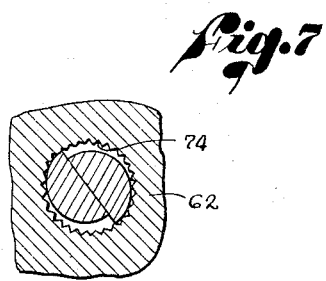
INVENTOR:
JAMES P. WATSON
HERZIG & JESSUP
ATTORNEYS
By Warren T. Jessup July 22, 1958  J. P. WATSON  2,844,743
DETENT MECHANISMS
Filed May 28, 1957  3 Sheets-Sheet 3

INVENTOR:
JAMES P. WATSON
HERZIG & JESSUP
ATTORNEYS
By Warren T. Jessup

United States Patent Office 2,844,743
Patented July 22, 1958

2,844,743
DETENT MECHANISMS
James P. Watson, Whittier, Calif.
Application May 28, 1957, Serial No. 662,174
10 Claims. (Cl. 310—37)

This invention relates to detent mechanisms, and more particularly to detent mechanisms such as are employed in stepping motors.

It is an object of this invention to provide detent mechanisms for holding the output shaft of a stepping motor stationary except during that period when the shaft is actually being stepped forward or backward.

It is a further object of this invention to provide a detent mechanism which positively engages and completely disengages the rotary part which it is desired to hold in position, thereby minimizing the friction load on the rotary part during the movement of the rotary part.

It is a further object of this invention to provide in a stepping motor a detent mechanism which is normally engaged with the motor shaft, thereby to restrain the shaft against motion, and which is positively moved out of engagement with the shaft during the stepping of the shaft in either direction and is maintained in engagement with the shaft at all other times.

It is a further object of this invention to provide a detent mechanism in a stepping motor having an oscillating rotor, the detent mechanism being so designed that it is moved out of engagement with the motor shaft only when the oscillating rotor moves in one direction, being maintained in shaft engagement during the return stroke of the oscillating rotor.

It is a further object of this invention to provide such a detent mechanism which may be alternatively constructed for mechanical engagement and disengagement with the motor shaft or for magnetic actuation.

It is a further object of this invention to provide a detent mechanism for a stepping motor in which a very minimum of load is placed on the rotor of the stepping motor by the detent mechanism which restrains the stepping motor shaft, except during the actual stepping of the motor.

In accordance with these and other objects which will become apparent hereinafter, preferred forms of the present invention will now be described with reference to the accompanying drawings, wherein:

Figure 1 is a longitudinal section of one form of the present invention, taken on line 1—1 of Figure 2;

Figure 2 is a cross-section taken on line 2—2 in Figure 1;

Figure 3 is a fragmentary detailed view showing the left hand detent mechanism of Figure 1 in disengaged position and taken generally in the same plane as Figure 1;

Figure 4 is a view similar to Figure 3 illustrating the detent mechanism in the engaged position of operation;

Figure 5 is a partially sectioned view looking down on the apparatus shown in Figure 1;

Figure 6 is an enlarged exploded perspective view showing portions of the detent mechanism;

Figure 7 is a fragmentary cross-section showing the manner in which the detent pivot pin is held against rotation;

Figure 8 is a cross-section taken on line 8—8 of Figure 1;

Figure 9 is a perspective view showing the disc which is keyed to the shaft of the apparatus;

Figure 10:
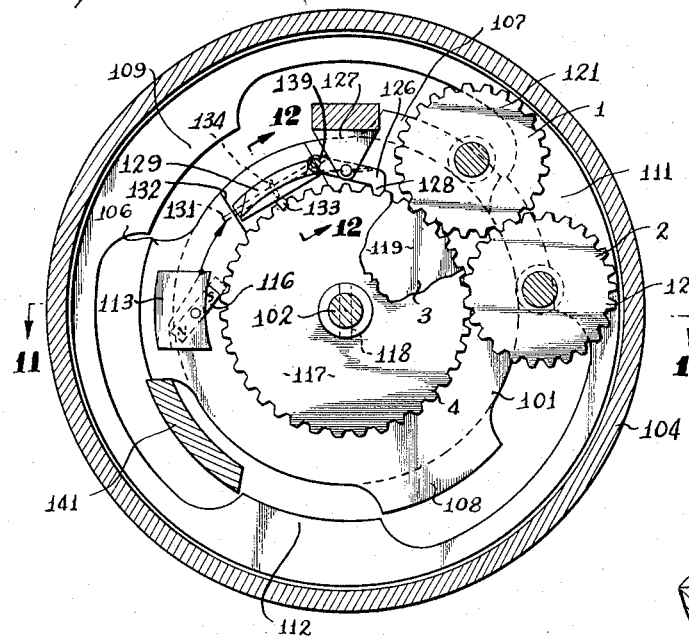
Figure 10 is a cross-section of another form of the present invention taken on line 10—10 in Figure 11.

Referring to the drawings, 21 designates generally a stepping motor embodying a magnetic form of the present detent mechanism invention. The type of stepping motor illustrated is generally similar to the type illustrated in my co-pending application Serial No. 607,422 filed August 31, 1956 for Axial Flux Electromagnetic Machinery, to which reference is made for a further understanding of the stepping motor generally.

The stepping motor 21 embodying the detent mechanism of the present invention comprises stator means 22 including a cylindrical casing 23, end plate 24 and end plate 26; a pair of rotor means or rotors 27 and 28; and shaft means 29 including a shaft 31 and a pair of shaft discs 32 and 33. The shaft 31 is journalled by bearings 34 and 36 in the end plates 24 and 26, respectively. It emerges through the end plate 24 as shown at 37, and it is from this end that the stepped output is taken from the motor 21. The shaft 31 is provided with square sections at 38 and 39, and the discs 32 and 33 are provided with corresponding square apertures, which mate with the sections 38 and 39, respectively, thereby keying the discs 32 and 33 to the shaft 31.

The rotors 27 and 28 are journalled on the central portion of the shaft 31 by sleeve bearings. As shown, the rotors 27 and 28 are juxtaposed axially, and since they oscillate in opposite directions, thrust between them is taken up by a thrust bearing 41. The rotors 27 and 28 are biased torsionally with respect to each other by a torsion spring 42, which resides in a pair of facing annular grooves formed in the juxtaposed inner faces of the rotors 27 and 28. Thus, when viewed from the left in Figure 1, the rotor 27 is biased counterclockwise by the spring 42, and the rotor 28 is biased clockwise.

The outer face of each rotor, for example the rotor 27, is provided with a series of oblique pawl-engaging grooves or notches 43 to receive a biased pawl 44, pivoted in an aperture 46 in the corresponding shaft disc 32. The pivotal mounting of the pawl 44 is balanced by pivoting the pawl on a pivot pin 47 which passes centrally through the pawl 44, as shown in Figures 1 and 2. The pawl 44 is biased into engagement with the rotor 27 by the permanent magnetism of the pawl, when the rotor 27 is not magnetized. When the rotor 27 is magnetized, one of the pawls is repelled and the other is further attracted.

At each end of the stator or stator means 22 are three inwardly projecting poles. The three poles on the left-hand end of Figure 1 are shown in Figure 2, and are numbered 48, 49 and 51, respectively. The inner diameter of the three poles is slightly larger than the outer diameter of three corresponding poles 52, 53 and 54 formed on the rotor 27 (Figure 8), so as to leave a slight clearance therebetween. Coaxially circumjacent the rotors 27 and 28 is an annular electric coil 56 mounted to the stator 22. The current is passed through the coil 56 in a given direction, a corresponding axial flux in a given direction is produced in the rotors 27 and 28. This flux emerges radially from the rotors, for example the rotor 27, through the three rotor poles 52, 53 and 54 and passes into the stator through the corresponding three stationary poles 48, 49 and 51. The magnetic field thus created applies a clockwise torque to the rotor 27 causing it to oscillate from the position shown in Figure 8, clockwise, through approximately 36 degrees as shown by the arrowed line 57. Simultaneously, the rotor 28 rotates in the opposite direction by virtue of the cooperation between its three poles and the respective three stator poles.

As explained in said co-pending patent application, the two pawls 44 and 58 are permanently magnetized, each with a north pole (or south pole) in operative relation to the outer face of the corresponding rotor. If it be assumed that the current in coil 56 is such as to create a north pole at the right-hand face of rotor 28 and a south pole at the left-hand face of rotor 27, then the pawl 58 is biased away from the rotor 28 and the pawl 44 is maintained more firmly in engagement with the face of the rotary 27. Thus the rotor 28 oscillates through its 36 degree stroke idly, since there is no engagement with the shaft disc 33. The rotor 27 on the other hand, through one of its oblique teeth or grooves 43, engages the pawl 44 and thus rotates the shaft disc 32 and shaft 31 through a corresponding angle. Upon de-energization of the coil 56, both rotors return to their rest position by virtue of the biasing spring 42. In this rest position the rotor 27, for example, bears against a stationary stop 61 formed integral with an interpole piece 62, located between the stationary poles 48 and 49 of the stator 22.

The detent mechanism forming the magnetic embodiment of the present invention comprises a pair of balanced detents pivotally mounted to the stator means 22 and cooperating with the respective shaft discs 32 and 33 and the respective rotors 27 and 28. The detent 63 that engages the shaft disc 32 will now be described, it being understood that its counterpart 64 is substantially identical.

Detent 63 is pivoted to the stator means 22 and more particularly to the interpole piece 62 by means of a pivot pin 66 (Figure 6) which is oriented substantially tangential to the axis of the shaft 31. The detent 63 oscillates in a slot 67 formed in the interpole piece 62 and is biased into engagement with the shaft disc 32 (i. e. counterclockwise in Figure 1) by the flexing of a spring wire 68 passing longitudinally through the detent 63 and through a transverse bore 69 in the pivot pin 66. In assembly, the detent 63 is held in position in the slot 67, and the pin 66 is passed into its bore 71 and through a transverse bore 72 in the detent 63. The inner end of the pin 66 is split longitudinally, as shown at 73, and the two split halves are offset, as best seen in Figure 7, so as to present diametric sharp edges, which engage splines 74 on the inner surface of the corresponding portion of the bore 71. The spring wire 68 is then passed into the detent 63 as shown in Figure 6 passing through the transverse bore 69 in the pin 66. The spring wire 68 is then held in place by a plug 76. By means of a kerf 77 on the outer end of the pin 66, the pin is rotated slightly counterclockwise, thereby stressing or flexing the spring wire 68 as shown in Figure 3. This biases the detent 63 to the counterclockwise position shown in Figure 4, bringing the tapered inner end of the detent against the upper wall of the slot, as shown at 78 in Figure 4.

The spring wire 68 is prevented from unwinding by virtue of the fact that reverse rotation of the pin 66 is prevented by engagement of the sharp edges of the semi-cylindrical pin halves with the splines 74, as shown in Figure 7. The pin 66 is prevented from coming out of the bore 71 by the presence of the spring wire 68. As best seen in Figures 3 and 4, the bore through which the spring wire 68 extends is of sufficient diameter to accommodate the flexing of the spring wire. At the inner end, the bore is ensmalled to accommodate only the end of the wire 68, while at the other end a similar small bore is provided on the inside of the plug 76.

The periphery of the shaft disc 32 is provided with a plurality of slanted notches 79 into which the free end of the detent 63 drops as shown in Figure 4. That side of the free end of the detent 63 which faces toward clockwise rotation of the disc 32 is square, as shown in Figure 2, while the opposite side which faces toward counterclockwise rotation is sloped or cammed as shown at 81. The width of the slot 79 is greater than the width of the detent 63 in order to give the detent time to drop into stopping position, as will be described hereinafter in connection with operation of this embodiment.

The embodiment of this invention illustrated in Figures 1–9 operates as follows. In quiescent condition, that is, with the coil 56 unenergized, the detent 63 abuts against one side of a notch 79 as shown in Figure 2. The detent 54 correspondingly abuts against one side of a notch formed in the opposite shaft disc 33. This prevents the disc 32 from moving clockwise when viewed from the left in Figure 1, and prevents the disc 33 from moving clockwise when viewed from the right in Figure 1. Since both discs are keyed by the square section 38—39 to the shaft 31, the entire shaft means 29 is thus locked against rotation in either direction. Let it now be assumed that the coil 56 is energized with a uni-directional current so as to create a north pole to the right, and a south pole to the left in Figure 1. The magnetomotive force thus created causes a magnetic flux to appear axially in the rotors 27 and 28 and the magnetic field thus induced draws the detent 63, which is made of soft iron, clockwise in Figure 1, thus lifting it out of the notch 79. The detent 64 is likewise actuated, in this case, counterclockwise in Figure 1, and is lifted from engagement with the shaft disc 33. In this manner, the shaft means 29 is freed for rotation in either direction. Substantially simultaneous with the operation of the detents 63 and 64, the pawl 44 is maintained in engagement with a notch 43 in the face of the rotor 27. The pawl 58, on the other hand, is repelled from its rotor 28 by the same magnetic flux.

The magnetism that disengages the detent from the shaft means and disengages the pawl 58 from the rotor 28 also causes the rotors 27 and 28 to oscillate in opposite directions. This is readily evident from Figure 8 where it will be seen that the magnetic field from the rotor pole 53 to the stator pole 49 causes the rotor 27 to rotate clockwise. The other two poles 52 and 54 add to the torque imparted to the rotor. At the other end of the stepping motor, i. e. the right-hand end in Figure 1, a similar action takes place with respect to rotor 28, that is, it oscillates clockwise when viewed from the right in Figure 1.

While the rotor 28 merely idles freely in its forward arcuate stroke, the rotor 27, being coupled to the shaft means 29 by the pawl 44, causes the shaft means 29 to oscillate (clockwise when viewed from the left in Figure 1) through an arc of approximately 36 degrees.

As best seen in Figure 8, after the rotor 27 has moved approximately 15 degrees clockwise, the rotor pole 53 will have moved away from the detent 63 sufficiently that the detent is no longer pulled inward magnetically by the rotor pole, and thereupon the biasing spring 68 returns the detent to the unmagnetized position, this being the position of the detent 63 which is shown in Figure 3.

As the detent 63 drops inward, it falls into the next succeeding notch 79 in the shaft disc 32, and forms a stop to limit further rotation of the disc 32 after approximately 36 degrees have been traversed.

At the other end of the stepping motor, i. e. the right-hand end in Figure 1, the shaft disc 33, when viewed from the right in Figure 1, has been rotating counterclockwise. The detent 64, when relieved of the magnetic influence of its pole piece by departure of its pole piece, attempts to drop inward under the bias of its spring 68. It encounters the periphery of the disc 33, however, and it is not until the shaft means 29 has completed its full 36 degree stroke that the detent 64 clears the shoulder of the notch and snaps downward into position. This locks the shaft means 29 against further rotation in either direction.

Thus, the stepping motor completes one step of its operation.

Upon de-energization of the coil 56, the two rotors 27 and 28 return to their quiescent positions and stop against their respective stop members 61.

The cam surface 81 is provided to insure that the detent which is adjacent the idling rotor does not block completion of the stroke of the shaft means 29, should the detent drop back into position before it has cleared the opposite side face of the notch in the shaft disc 33.

If the coil 56 is energized with current to create a magnetic field with the north pole at the left and the south pole at the right in Figure 1, then the shaft means 29 is stepped in the opposite direction by virtue of engagement between the pawl 58 and rotor 28 and corresponding lack of engagement between the pawl 44 and rotor 27.

As the rotors return to rest position, they do not influence their respective detents because they are unmagnetized.

The notches 79 are sufficiently wide to insure that the detent will have sufficient time to drop into place, since the rotation of the discs is very rapid under the magnetic field induced.

The detents 63 and 64 must be of paramagnetic material, and likewise the rotors 27 and 28. It is preferred to make the interpole pieces represented by 62 in Figure 6 of nonmagnetic material, and likewise the pivot pin 66 and spring wire 68.

Since the detent 63 serves as a stop to receive the impact at the end of the forward stroke of the disc 32, it is preferable to extend the forward face of the interpole piece 62 as far forward as possible, as shown at 82, in order that the side wall of the slot 67 may back up the detent 63 thereby reducing the impact moment on the pivot pin 66.

The stator parts are held in place by the two end plates 24 and 26, which are in turn held in by snap rings 83 and 84, respectively.

A second form of this invention is illustrated in Figures 10–14. In this embodiment, a single rotor 101 is sleeve journalled on a shaft 102 which is in turn journalled in end plates 103 of a stator having a cylindrical housing 104. The rotor 101 is provided with three radial poles 106, 107 and 108, which cooperate with respective stator poles 109, 111 and 112 to effect oscillation of the rotor 101.

Projecting longitudinally from the face of the rotor 101 is an arm 113, which carries a pair of magnetic pawls 114 and 116 that are permanently magnetized in opposite polarity. For example, the extending end of the pawl 114 is a north pole, while the extending end of the pawl 116 is a south pole. The pawl 114 is adapted to engage with the teeth of a drive gear or ratchet 117 which is pinned at 118 to the shaft 102. The pawl 116 is adapted to engage the teeth of a similar drive gear 119, which is freely journalled on the shaft 102 and meshes with a gear 121 journalled to the end plate 103. The gear 121 in turn meshes with a gear 122, likewise journalled to the end plate 103, which in turn meshes with the gear 117.

When the coil 123 is energized to induce axial magnetic flux in the rotor 101, either a north pole or a south pole is produced at the periphery of the gears 117 and 119 depending on the direction of current in the coil 123. If a south pole is created in the gearing, then the pawl 114 remains in engagement with the gear 117 while the pawl 116 is disengaged by the repelling force of similar polarities from gear 119. With the pawl 114 engaged with the gear 117, the forward stroke of the rotor 101 which is clockwise in Figure 10, causes the gear 117 and the shaft 102 to move clockwise through a stroke of approximately 36 degrees.

Should the magnetic polarity be such as to effect a north pole in the gearing, then the pawl 116 remains in engagement with the gear 119, while the pawl 114 is disengaged. In this event, the forward clockwise stroke of the rotor 101 causes a corresponding clockwise oscillation of the gear 119 which is reversed through the gearing 121, 122 and 117 into a corresponding counterclockwise stroke or oscillation of the shaft 102. Thus, as in the first embodiment described, the direction of the step of the shaft 102, i. e. clockwise or counterclockwise, is determined by the polarity of the current in the coil 123.

As in the first embodiment described, detent means are provided for holding the shaft 102 against rotation except during the forward stroke of the rotor 101. This detent is shown as a balanced member 126 pivoted to the arms of a trunnion 127 which extends inwardly from the end plate 103. The detent 126 has a tooth 128 which engages between the teeth of the gear 117 to lock the gear against rotation. It is normally biased clockwise toward engagement with the gear 117 and is pivoted out of engagement by a detent actuating means now to be described.

The detent actuating means of Figures 10–14, instead of being magnetic as in the first embodiment, is mechanical. It comprises a pivoted cam member 129 pivoted by means of a pin 131 in a recess 132 formed in the rotor 101. The member 129 is biased counterclockwise (Figure 12) against a stop pin 133 that projects into the recess 132 from the rear wall thereof. This biasing is effected by a spring wire 134 constructed and arranged in a manner similar to the spring wire 68 shown in Figures 3 and 4.

The extending face of the detent actuating member 129 is provided with an arcuate portion 136 having an undercut cam face 137 on its forward end, and an overcut cam face 138 at its rear end. The rear end of the detent 126 is provided with a pin 139 which extends into engagement with the arcuate forward portion 136 of the detent actuating member 129.

Figure 13:
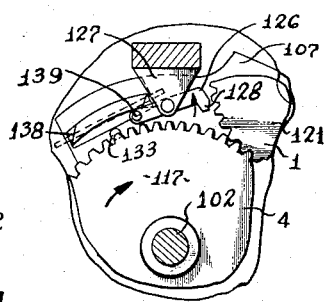
Figure 13 is a fragmentary view similar to Figure 10 showing the detent mechanism in a different position of operation.

In operation, as the rotor 101 makes its forward clockwise stroke (Figure 10), the cam surface 137 comes into engagement with the pin 139 and pivots the detent 126 counterclockwise (Figure 13) out of engagement with the gear 117. The pawl 114 (or 116) is thus free to move the shaft 102 through one angular step. As the rotor 101 continues its stroke, the pin 139 rides under the face of the arcuate portion 136, as shown in Figure 13. In this operation the member 129 is prevented from pivoting by the stop pin 133. As the rotor 101 completes its forward stroke, the pin 139 clears the end of the arcuate portion 136 allowing the detent 126 to snap back into engagement with the gear 117.

Figure 12:
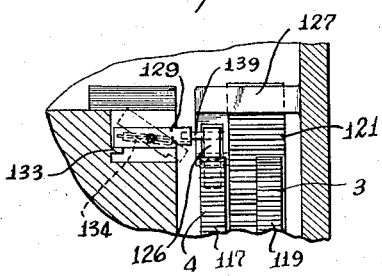
Figure 12 is a fragmentary longitudinal section taken on line 12—12 in Figure 10 showing the detent mechanism in detail.
Figure 11:
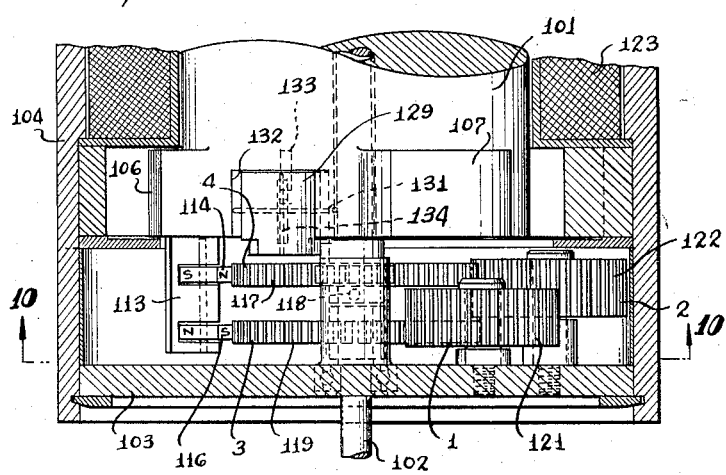
Figure 11 is a fragmentary top view of the second form of the present invention with the case and coil sectioned.
Figure 14:
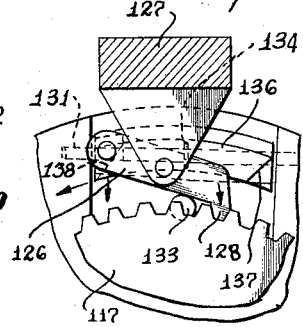
Figure 14 is an enlarged fragmentary view similar to Figure 13 showing the detent mechanism in still another position of operation.

Upon deenergization of the coil 123, the rotor 101 is returned counterclockwise to a rest position against a stop 141. At the start of this return stroke, shown in Figure 14, the pin 139 comes into engagement with the cam surface 138, camming the detent actuating member 129 downward or clockwise (Figure 12). In this operation the pin 139 cannot be forced upward by the member 129 because of the engagement of the tooth 128 against the gear 117. As the rotor 101 returns to rest position shown in Figure 10, the pin 139 clears the right-hand end of the arcuate portion 136, allowing the member 129 to snap counterclockwise (Figure 12) against the stop 133.

The detent 126 operates the same way irrespective of the magnetization polarity of the coil 123, inasmuch as the oscillating stroke of the rotor 101 is identical. The only difference is that the gear 117 moves in the opposite direction, being impelled not directly by the pawl 114 but indirectly by the pawl 116 through the reversing gears 119, 121 and 122.

The embodiment shown in Figures 10–14 has the advantage that the full output torque of the single rotor 101, having pole pieces 106, 107, 108 at each end thereof, is applied to the shaft. In the first embodiment the rotor is divided into two parts with one part idling and not producing useful output torque.

Since the detent 126 is mechanically driven, it may be biased much more strongly than the magnetic detent 63, and thus it is not essential to provide a long interval between gear teeth into which the tooth 127 may drop, since the speed of operation of the detent 126 under a heavy bias may be made to match the rapid speed of the stepping operation. It may still be desirable, however, to provide a greater distance between gear teeth in the gear 117, and in this event two detents 126 each engaging long notches would be used in a manner similar to that described in conjunction with the notches 79 illustrated in the first embodiment. In this event the notches would be distinct from the gear teeth, which are necessary to link with the reversing gears. Sufficient space is left between the end of each magnetic pawl 114, 116 and the corresponding tooth to allow enough movement of the rotor 101 to disengage the detent 126 before the gear 117 starts to move under the impetus of the pawl.

It will be noted that in both embodiments shown all parts are of balanced construction so as to be impervious to accelerative and impact forces.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

What is claimed is:

1. Detent mechanism comprising stator means, rotor means rotatably mounted with respect to said stator means, shaft means rotatably mounted with respect to said stator means, movable detent means for effecting engagement between said stator means and said shaft means to inhibit rotation of said shaft means, and detent actuating means for causing said detent means to effect successive disengagement and engagement between said shaft means and said stator means in response to rotor means position during rotation of said rotor means in one direction, and maintaining continued engagement between said shaft means and said stator means upon rotation of said rotor means in the opposite direction.

2. Mechanism in accordance with claim 1, comprising in addition pawl means selectively engageable between said rotor means and said shaft means for rotating said shaft means upon rotation of said rotor means.

3. Mechanism in accordance with claim 2, including in addition means for effecting oscillation of said rotor means.

4. Mechanism in accordance with claim 3, wherein said oscillation effecting means comprises electric coil means for effecting a magnetic field to produce said oscillation.

5. Mechanism in accordance with claim 1, wherein said detent actuating means includes paramagnetic means for effecting movement of said detent means by influence of a magnetic field.

6. Mechanism in accordance with claim 1, wherein said detent actuating means comprises a cam member moveably mounted on said rotor and engageable with said detent means upon oscillation of said rotor means.

7. Detent mechanism comprising rotatably mounted shaft means, a rotor rotatably mounted coaxially with respect to said shaft means, detent means having at least a portion made of paramagnetic material movably mounted with respect to said rotor and said shaft means, pawl means for linking said rotor to said shaft means, means on said shaft means engageable by said detent means, means for effecting oscillation of said rotor, means for magnetizing said rotor, said detent means being under the magnetic influence of said rotor when said rotor is in certain positions whereby said detent means is held magnetically out of engagement with said shaft means when said rotor is in said position.

8. Detent mechanism comprising a stator, shaft means rotatably mounted with respect to said stator, a rotor rotatably mounted with respect to said stator, detent means having at least a portion made of paramagnetic material movably mounted with respect to said stator and adjacent said rotor, means on said shaft means engageable by said detent means, means for selectively magnetizing said rotor, said detent means being under the magnetic influence of said rotor during a portion of the rotation of said rotor, whereby the position of said detent means with respect to said shaft means is changed by rotation of said rotor.

9. Detent mechanism comprising stator means, shaft means rotatably mounted with respect to said stator means, rotor means oscillatably mounted coaxially of said shaft means, pawl means selectively engageable between said rotor means and said shaft means for rotating said shaft means upon rotation of said rotor means, detent means pivotally mounted on said stator means, a portion of said detent means being engageable with said shaft means to inhibit rotation of said shaft means, means for biasing said detent means into engagement with said shaft means, said rotor means having at least one pole oscillatable past a portion of said detent means, said portion of said detent means being of paramagnetic material, said pole also being of paramagnetic material for magnetically influencing said detent means, oscillation of said rotor means causing withdrawal of said pole away from said detent portion, thereby to allow said biasing means to effect engagement between said detent means and said shaft means.

10. Pin securement means comprising a body having a bore therein, at least a portion of said bore having longitudinal splines disposed around the bore, said pin being split longitudinally into two portions, said portions being laterally offset parallel to the split therebetween, the edges of the offset portions engaging said splines to restrain pin rotation in one direction, and means for inhibiting axial removal of said pin from said bore.

No references cited.